Figure 1:
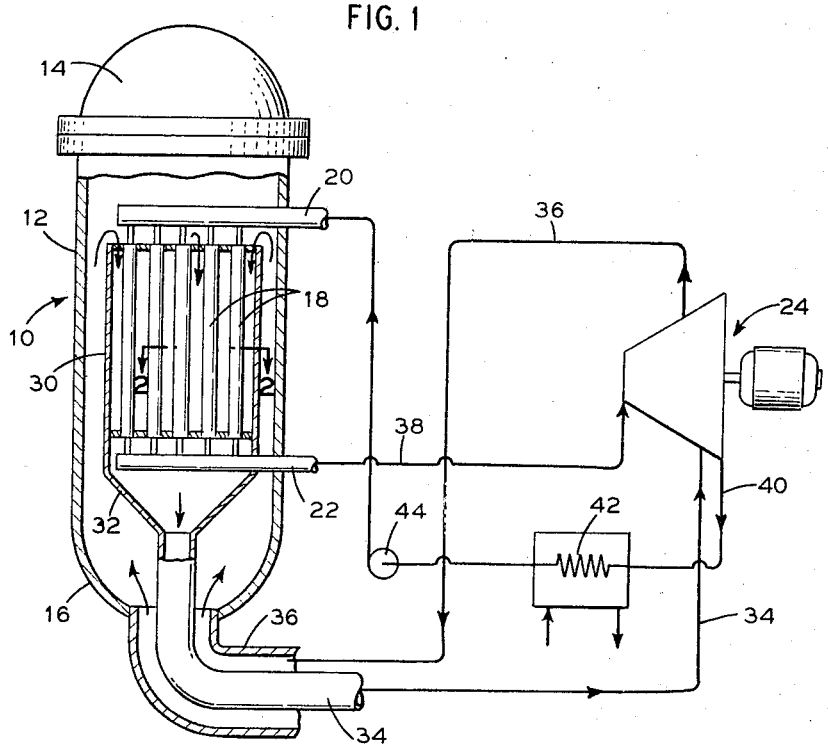

Nov. 14, 1967  D. C. SCHLUDERBERG ET AL  3,352,365

NUCLEAR REACTOR SYSTEM

Filed June 26, 1964

INVENTOR.
Donald C. Schluderberg
Robert W. Carlson

ATTORNEY

United States Patent Office 3,352,365
Patented Nov. 14, 1967

3,352,365
NUCLEAR REACTOR SYSTEM
Donald Carroll Schluderberg and Robert William Carlson, Lynchburg, Va., assignors to The Babcock & Wilcox Company, New York, N.Y., a corporation of New Jersey
Filed June 26, 1964, Ser. No. 378,152
4 Claims. (Cl. 176—55)

The present invention relates in general to a nuclear reactor system and more particularly to a reactor system wherein the reactor moderator material advantageously is cooled by coolant extracted or withdrawn from the prime mover portion of the power generating system.

Many reactors incorporate nuclear fuel elements disposed within a separate neutron moderator, such as graphite, wherein the fuel elements are cooled by a fluid such as water. In many of these reactors steam is generated by the heat from the fission-type chain reaction. This dry saturated or superheated steam is removed from the reactor for conversion to useful work in a prime mover, such as the turbine of a turbo-generator, thus utilizing the heat from the nuclear chain reaction. After passing through the turbine, the steam is condensed and the condensate is reintroduced into the reactor to absorb heat from the fuel elements in the reactor. In these reactors which utilize a separate moderator, it is necessary to provide a coolant for the moderator material to maintain its temperature within the permissible operating range. A separate coolant cricuit which used an inert gas, such as nitrogen or helium, has been used for cooling the moderator material and to maintain the moderator temperature within the desired limits. As a consequence the cost of the reactor system has been substantially increased due to the necessity of providing the separate moderator coolant circuit with its large, expensive heat exchanger to remove the heat from the moderator coolant fluid. Furthermore, heat removed from the moderator coolant fluid generally was not reclaimed and thus did not contribute to the overall efficiency of the reactor system.

In the arrangement of the present invention a portion of the coolant is extracted from an intermediate stage of the turbine and is passed through the reactor moderator where it is reheated by removing heat from the moderator material. This reheated coolant is then returned to the turbine downstream from the point where it was extracted to supplement the available heat energy in the fluid, thereby producing additional useful work.

The moderator coolant circuit of the present invention introduces stage reheating in the heat transfer portion of the cycle associated with the nuclear reactor system by providing the necessary cooling for the moderator material, thereby increasing the system efficiency, and decreasing the capital expenditure necessary for the system.

Accordingly, the present invention is directed to a method of operating a nuclear reactor system comprising a nuclear reactor having a plurality of fissionable material bearing fuel elements arranged therein as a core to undergo a self-sustaining fission-type chain reaction with neutron moderating material surrounding the fuel elements, and a prime mover communicating therewith. The method comprises the steps of passing a coolant fluid through the fuel elements to remove the heat generated by the chain reaction, passing the heated fluid through the prime mover, extracting a portion of the fluid from the prime mover and circulating that portion through the moderating material to reheat the fluid and to cool the moderator material, returning the reheated fluid to the prime mover at a point downstream from the extraction point, and returning the fluid from the prime mover to the fuel elements.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 2:
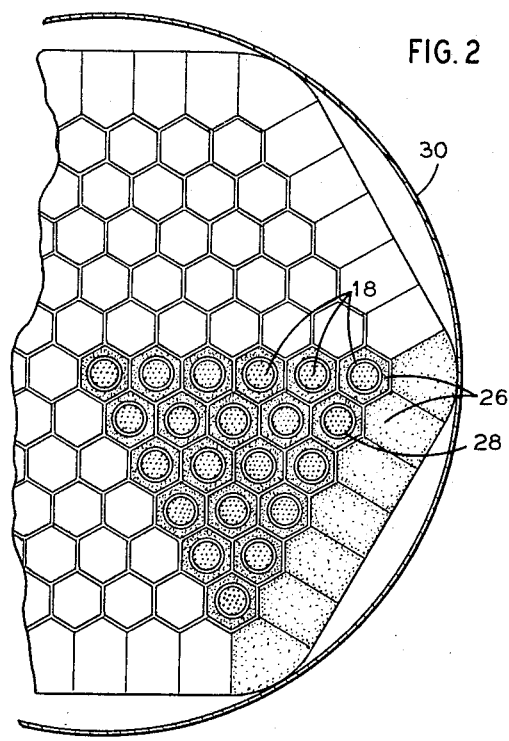

In the drawings:
FIG. 1 is a generally schematic illustration of the reactor system of the present invention; and
FIG. 2 is a greatly enlarged cross-section through the reactor core taken along line 2—2 of FIG. 1.

The reactor system of the present invention is illustrated in FIG. 1, wherein the reactor 10 comprises a vertically elongated cylindrical pressure vessel 12 closed at the top and bottom by hemispherical heads 14 and 16, respectively. A plurality of fissionable material bearing fuel elements 18 are arranged within the reactor as a core capable of undergoing a fission-type chain reaction. The coolant flow channels of the fuel elements 18 are connected to and open into inlet and outlet plenums, 20 and 22 respectively. As illustrated in FIG. 2, the fuel elements 18 are surrounded by moderator material 26 which, for example, may be graphite blocks. In the particular example illustrated, the fuel elements 18 are contained within tubular elements 28 which extend through bores provided through the center graphite blocks 26. The bores in these graphite blocks have a larger internal diameter than the outside of the tubular elements 28 thus providing a flow space around the exterior of the tubular elements. Furthermore, sufficient space is provided between adjacent graphite blocks for the passage of a coolant fluid as will be more thoroughly described hereinbelow.

The fuel elements 18 and the graphite moderator material 26 are supported by conventional means within the pressure vessel 12. The outer surface of the core is circumscribed by a shell 30 which is open at the top, and at the bottom terminates in a frusto-conical member 32 connected to line 34 which extends through the lower portion of the pressure vessel. Another line 36 surrounding and coaxial with line 34 opens to the interior of the pressure vessel 12 outside of shell 30.

The outlet plenum 22 of the reactor communicates with line 38 which leads to the inlet of the turbine of the turbo-generator 24. Line 36 communicates with an extraction point in the turbine for removing a portion of the steam passing therethrough. Line 34 returns extracted steam, after it has been reheated, to the turbine downstream of the extraction point. Steam leaves the turbine via line 40, is condensed in a condenser 42, and is returned to the inlet plenum 20 by pump 44.

In operation, the coolant fluid, for example water, is introduced into the fuel elements 18 through inlet plenum 20. In passing through the fuel elements the fluid is heated, and, if water it may be vaporized and superheated. The coolant fluid leaves the reactor via outlet plenum 22 and is passed through line 38 to the inlet of the turbo-generator 24. As previously mentioned, an extraction point is provided in the turbine for removing a portion of the steam passing therethrough via line 36 for reheating and subsequent reintroduction into the reactor 10 at a pressure lower than that in the fuel elements. The extracted portion of the steam is circulated through the moderator material, passing through the spaces formed between adjacent moderator material blocks 26 and also through the annular spaces formed by tubes 28, which contain the fuel elements, and the moderator material 26, thereby cooling the moderator material and reheating the steam. The reheated steam is then returned to the turbo-generator via line 34 where it produces further work.

A specific example of a reactor system utilizing the present invention is illustrated in Table I.

*Table I*

Reactor power:
| | |
|---|---|
| From core _____mw.(t)__ | 743 |
| From moderator _____mw.(t)__ | 39 |
| Gross reactor output _____mw.(t)__ | 782 |
| Net plant output _____mw.(e) (=35.7%)__ | 279 |
| Turbine throttle temperature _____° F__ | 1000 |
| Turbine throttle pressure _____p.s.i.a__ | 1000 |
| Steam flow _____lb./hr__ | 2,082,000 |

Turbine extraction:
| | |
|---|---|
| Pressure _____p.s.i.a__ | 35 |
| Temperature _____° F__ | 300 |
| Flow _____lb./hr__ | 694,000 |

Turbine reheat inlet:
| | |
|---|---|
| Pressure _____p.s.i.a__ | 30 |
| Temperature _____° F__ | 700 |

In the system illustrated in Table I the reheat cycle utilizing the moderator material as the reheat source increases the net plant efficiency from 1 to 1½% while at the same time eliminating the expensive auxiliary equipment that would otherwise be necessary to remove the heat generated in the moderator material.

As a result of the present invention it is possible to simplify the equipment necessary for a nuclear reactor plant while at the same time improving the efficiency of the system.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear reactor plant comprising a nuclear reactor having a plurality of fissionable material bearing fuel elements arranged within said reactor as a core to undergo a self-sustaining fission-type chain reaction, a neutron moderating material surrounding said fuel elements to control said chain reaction, prime mover means operatively associated with said reactor, means for passing a coolant fluid in heat exchange relation with said fuel elements to remove heat generated by said chain reaction, means for passing said heated fluid through said prime mover means to produce work, means for extracting a portion of said fluid from said prime mover means, means for cooling said moderator material including means for circulating the extracted fluid through said moderating material throughout substantially the entire extent of said core to reheat the fluid, said fluid being reheated comprising the primary source of cooling effect on said moderating material, means for returning said reheated fluid to said prime mover means to produce additional work, and means for returning said fluid from said prime mover means to said reactor.

2. A nuclear reactor plant comprising a nuclear reactor having a plurality of tubular elements therein, a plurality of fissionable material bearing fuel elements arranged within said tubular elements as a core to undergo a self-sustaining fission-type chain reaction, a neutron moderating material surrounding said fuel elements to control said chain reaction, prime mover means operatively associated with said reactor, means defining flow passages through said moderating material, said passages being isolated from the interiors of said tubular elements, means for passing a coolant fluid through said tubular elements to remove heat generated by said chain reaction from said fuel elements, means for passing said heated fluid through said prime mover means to produce work, means for extracting a portion of said fluid from said prime mover means, means for cooling said moderator material including means for circulating the extracted fluid through the flow passages in said moderating material throughout substantially the entire extent of said core to reheat the fluid, said fluid being reheated comprising the primary source of cooling effect on said moderating material, means for returning said reheated fluid to said prime mover means to produce work, and means for returning said fluid from said prime mover means to said tubular elements in said reactor.

3. A nuclear reactor plant comprising a nuclear reactor having a plurality of tubular elements therein, a plurality of fissionable material bearing fuel elements arranged within said tubular elements as a core to undergo a self-sustaining fission-type chain reaction, solid neutron moderating material surrounding said fuel elements to control said chain reaction, means defining flow passages through said moderating material, said passages being isolated from the interiors of said tubular elements, prime mover means operatively associated with said reactor, means for introducing a coolant fluid in the form of liquid into said tubular elements at a first pressure to pass therethrough in heat exchange relation with said fuel elements to remove heat generated by said chain reaction from said fuel elements and to vaporize said liquid, means for passing said vapor through said prime mover means to produce work, means for extracting vapor from said prime mover means at less than said first pressure, means for cooling said moderating material including means for circulating the extracted vapor through the flow passages in said moderating material throughout substantially the entire extent of said core at less than said first pressure to reheat the vapor, said fluid being reheated comprising the primary source of cooling effect on said moderating material, means for returning the reheated vapor to said prime mover means to produce additional work, means for condensing said vapor, and means for returning the condensed vapor to said tubular elements in said reactor at said first pressure.

4. A nuclear reactor plant according to claim 3 wherein said liquid is water and said vapor is steam.

References Cited

UNITED STATES PATENTS

| | | | |
|---|---|---|---|
| 3,047,479 | 7/1962 | Young et al. _____ | 176—60 |
| 3,069,341 | 12/1962 | Daniels _____ | 176—55 |
| 3,085,959 | 4/1963 | Germer _____ | 176—60 |
| 3,085,964 | 4/1963 | Ritz et al. _____ | 176—60 |
| 3,108,938 | 10/1963 | Nettel et al. _____ | 176—59 |
| 3,175,953 | 3/1965 | Nettel et al. _____ | 176—60 |
| 3,240,678 | 3/1966 | Hemmerle et al. ____ | 176—60 X |
| 3,247,075 | 4/1966 | Ryon et al. _____ | 176—60 X |
| 3,249,506 | 5/1966 | Tower et al. _____ | 176—60 X |

FOREIGN PATENTS

| | | |
|---|---|---|
| 1,141,064 | 3/1957 | France. |

L. DEWAYNE RUTLEDGE, *Primary Examiner.*